US012627622B2

(12) United States Patent     (10) Patent No.:   US 12,627,622 B2

Kim et al.     (45) Date of Patent:    May 12, 2026

(54) ARTIFICIAL INTELLIGENCE CONVERSATION SERVICE SYSTEM

(71) Applicant: MINDLOGIC INC., Seoul (KR)

(72) Inventors: Yongwoo Kim, Seoul (KR); Jinwook Kim, Seoul (KR)

(73) Assignee: MINDLOGIC INC., Seoul (KR)

( * ) Notice: Subject to any disclaimer, the term of this patent is extended or adjusted under 35 U.S.C. 154(b) by 0 days.

(21) Appl. No.: 18/832,364

(22) PCT Filed: Jan. 25, 2023

(86) PCT No.: PCT/KR2023/001120
§ 371 (c)(1),
(2) Date: Jul. 23, 2024

(87) PCT Pub. No.: WO2023/140720
PCT Pub. Date: Jul. 27, 2023

(65) Prior Publication Data
US 2025/0202846 A1    Jun. 19, 2025

(30) Foreign Application Priority Data

Jan. 24, 2022   (KR) ........................ 10-2022-0009931
Feb. 14, 2022   (KR) ........................ 10-2022-0018824

(51) Int. Cl.
*G06F 15/16*     (2006.01)
*G06F 3/04842*    (2022.01)
(Continued)

(52) U.S. Cl.
CPC .......... *H04L 51/04* (2013.01); *G06F 3/04842* (2013.01); *H04L 51/02* (2013.01); *H04L 51/224* (2022.05)

(58) Field of Classification Search
CPC ....... H04L 51/04; H04L 51/02; H04L 51/224; G06F 3/04842; G06Q 50/40; G06T 13/40
See application file for complete search history.

(56) References Cited

U.S. PATENT DOCUMENTS 10,796,218 B2 * 10/2020 Tan ......................... H04L 51/02
2001/0033298 A1 * 10/2001 Slotznick ............. G06Q 10/107
715/758

(Continued)

FOREIGN PATENT DOCUMENTS

JP      2020077425 A     5/2020
KR    1020000036463     7/2000

(Continued)

OTHER PUBLICATIONS

International Search Report mailed on Jul. 27, 2023, issued in the corresponding International Application No. PCT/KR2023/001120, filed on Jan. 25, 2023; 5 pages.

(Continued)

*Primary Examiner* — John B Walsh

(74) *Attorney, Agent, or Firm* — IPkey PLLC

(57) ABSTRACT

The present disclosure relates to a method and a system for opening a session of a chat service for a fictitious chat starter message when a partner user responds to the fictitious chat starter message. The method includes providing the fictitious chat starter message and opening a chatroom session between a first user who sent the chat starter message and a second user who received the chat starter message, when the chat starter message is clicked by the second user.

6 Claims, 10 Drawing Sheets

(51) Int. Cl.
    *H04L 51/02*      (2022.01)
    *H04L 51/04*      (2022.01)
    *H04L 51/224*    (2022.01)

(56)           References Cited

U.S. PATENT DOCUMENTS

| | | | |
|---|---|---|---|
| 2014/0122619 A1* | 5/2014 | Duan | ........................ G06F 40/20 |
| | | | 709/206 |
| 2017/0323266 A1 | 11/2017 | Seo | |
| 2022/0057907 A1* | 2/2022 | Lemay | .............. H04M 1/27475 |

FOREIGN PATENT DOCUMENTS

| | | |
|---|---|---|
| KR | 1020010007695 | 2/2001 |
| KR | 1020070044267 | 4/2007 |
| KR | 1020160125812 | 11/2016 |
| KR | 1020170103586 | 9/2017 |
| KR | 1020180095478 | 8/2018 |
| KR | 1020190069218 | 6/2019 |
| KR | 1020190080599 | 7/2019 |
| KR | 1020210019111 | 2/2021 |
| KR | 1020210040208 | 4/2021 |
| KR | 1020210082731 | 7/2021 |
| KR | 1020210093003 | 7/2021 |
| KR | 1020210156741 | 12/2021 |

OTHER PUBLICATIONS

Written Opinion of the International Searching Authority mailed on Jul. 27, 2023, issued in the corresponding International Application No. PCT/KR2023/001120, filed on Jan. 25, 2023; 3 pages.

* cited by examiner

< Gomdori-Talk

Gomdori-Talk

Hello

AI response
LV.1

Send

700

ARTIFICIAL INTELLIGENCE CONVERSATION SERVICE SYSTEM

CROSS REFERENCE TO RELATED APPLICATIONS

This application is a U.S. national stage of International Application No. PCT/KR2023/001120, filed on Jan. 25, 2023, which claims priority to Korean Application No. 10-2022-0018824, filed on Feb. 14, 2022, and Korean Application No. 10-2022-0009931, filed on Jan. 24, 2022, the entire disclosures of which are incorporated herein in entirety.

TECHNICAL FIELD

The present disclosure relates to a method and system for opening a session for a fictitious chat starter message, and more particularly to a technique for opening a session of a chat service when a partner user responds to a fictitious chat starter message.

In addition, the present disclosure relates to a method and system for setting up a friend group, and more particularly to a technique for categorizing a friend group according to conversation between an Artificial Intelligence character and a creator.

BACKGROUND ART

Artificial Intelligence (AI) is revolutionizing business, organizational operations, lifestyles, and communication methods. Various information projects are being carried out to provide optimal services to the rapidly changing lifestyles of modern culture and the constantly changing needs of customers. Among them, big data and deep learning technologies have been rapidly developing, and AI technologies that are being applied to real life in certain fields have been implemented and are also being applied to intelligent personal services that analyze specific data and integrate and utilize information from various fields specialized for each individual. Currently, interaction between AI and humans is made in the form of everyday natural language, that is, in the form of conversation in spite of limitation. Although the interaction is still in its infancy, various home appliances connected via a network are being controlled through conversations using voice, and search, inquiry, and response with respect to specific information are becoming possible through a knowledge base using deep learning.

Prior Art Literature (Patent literature 1) Korean Patent Publication No. 10-2021-0156741 (published on Dec. 27, 2021)

DETAILED DESCRIPTION OF THE INVENTION

Technical Problem

An object of the present disclosure is to open a chatroom session between an artificial intelligence character and a partner user (or partner artificial intelligence character) when the partner user responds to a fictitious chat starter message randomly sent by the artificial intelligence character.

However, the technical problems to be solved by the present disclosure are not limited to the above problems, and may be variously expanded without departing from the technical spirit and scope of the disclosure.

An object of the present disclosure is to finely categorize a friend group based on a conversation between an artificial intelligence character or a creator.

However, the technical problems to be solved by the present disclosure are not limited to the above problems, and may be variously expanded without departing from the technical spirit and scope of the disclosure.

Technical Solution

According to an embodiment of the present disclosure, a method for opening a session of a chatroom for a fictitious chat starter message when a partner user responds to the fictitious chat starter message includes providing the fictitious chat starter message, and opening a chatroom session between a first user who sent the chat starter message and a second user who received the chat starter message, when the chat starter message is clicked by the second user.

According to an embodiment of the present disclosure, a system for opening a session of a chatroom for a fictitious chat starter message when a partner user responds to the fictitious chat starter message includes a starter message providing unit that provides the fictitious chat starter message, and a session opening unit that opens a chatroom session between a first user who sent the chat starter message and the second user who received the chat starter message, when the chat starter message is clicked by the second user.

According to an embodiment of the present disclosure, a method for setting up a friend group includes providing chat service between a chatter and a chat partner, determining whether an artificial intelligence character or a creator who has created the artificial intelligence character has participated in the chat service, and categorizing the friend group associated with the chat service based on the determination result.

According to an embodiment of the present disclosure, the method for setting up the friend group may further include changing a UI of an artificial intelligence character by group according to the friend group.

According to an embodiment of the present disclosure, a system for setting up a friend group includes a chat provision unit that provides a chat service between a chatter and a chat partner, a determination unit that determines whether an artificial intelligence character or a creator who has created the artificial intelligence character has participated in the chat service, and a group categorization unit that categorizes a friend group associated with the chat service.

According to an embodiment of the present disclosure, the system for setting up the friend group may further include a control unit that changes a UI of an artificial intelligence character by group according to the friend group.

Advantageous Effects of the Invention

When a partner user responds to a fictitious chat starter message randomly sent by an AI character according to an embodiment of the present disclosure, a chatroom session is opened between the AI character and the partner user (or the partner AI character), thereby inducing diverse and free conversations through the AI character, and preventing the creation of meaningless chatrooms in the partner's chat list.

However, the effects of the present disclosure are not limited to the above effects, and may be variously expanded without departing from the spirit and scope of the present disclosure.

According to an embodiment of the present disclosure, by finely categorizing friend groups based on conversations between artificial intelligence characters or creators, the closeness of the chat partner with respect to the user (or first creator) may be identified, and chat services of different depths may be provided by a chat engine trained based on the closeness.

According to an embodiment of the present disclosure, by categorizing and grouping chat services, different additional services may be provided to groups.

However, the effects of the present disclosure are not limited to the above effects, and may be variously expanded without departing from the spirit and scope of the present disclosure.

DESCRIPTION OF THE DRAWINGS

FIG. 2 is an example diagram for describing internal configurations of an electronic device and a server illustrated in FIG. 1.

FIGS. 4 to 6 illustrate an example of opening a session for a fictitious chat starter message according to an embodiment of the present disclosure.

BEST MODE

Figure 1:
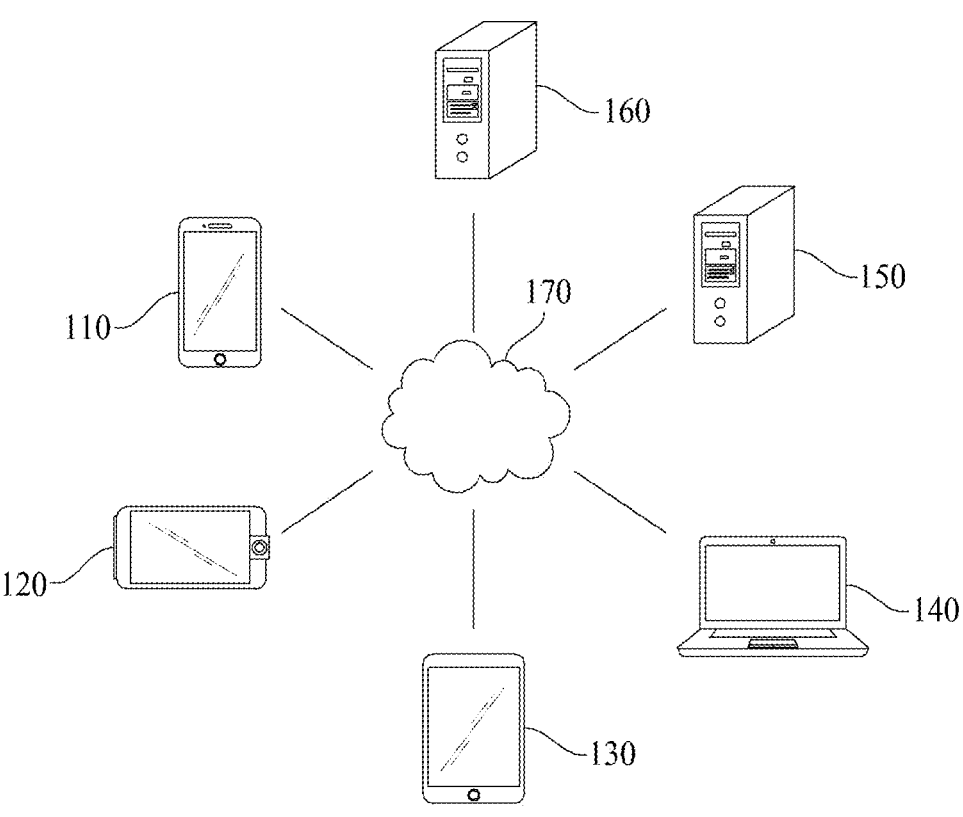
FIG. 1 illustrates an example diagram for describing a network environment according to an embodiment of the present disclosure.

Advantages and features of the present disclosure and methods for achieving them will be apparent with reference to embodiments described below in detail in conjunction with the accompanying drawings. However, the present disclosure is not limited to the embodiments disclosed below, but can be implemented in various forms, and these embodiments are to make the disclosure of the present disclosure complete, and are provided so that this disclosure will be thorough and complete and will fully convey the scope of the invention to those of ordinary skill in the art, which is to be defined only by the scope of the claims.

The terminology used herein is for the purpose of describing particular embodiments only and is not intended to be limiting of the present disclosure. The singular expressions include plural expressions unless the context clearly dictates otherwise. In this specification, the terms "comprises" and/ or "comprising" are intended to specify the presence of stated features, integers, steps, operations, elements, parts or combinations thereof, but do not preclude the presence or addition of steps, operations, elements, parts, or combinations thereof.

Unless defined otherwise, all terms (including technical and scientific terms) used herein have the same meanings as commonly understood by one of ordinary skill in the art to which this invention belongs. Further, unless explicitly defined to the contrary, the terms defined in a generally-used dictionary are not ideally or excessively interpreted.

Hereinafter, preferred embodiments of the present disclosure will be described in detail with reference to the accompanying drawings. The same reference numerals are used for the same components in the drawings, and duplicate descriptions of the same components are omitted.

A method and a system for opening a session for a fictitious chat starter message according to an embodiment of the present disclosure are characterized by opening a chatroom session between an AI character and a partner user (or partner AI character) when the partner user responds to the fictitious chat starter message sent randomly by the AI character.

An online chat server of the present disclosure may create an AI character in the form of a mobile application and provide a chat service between the crated AI character and a follower following the AI character and evaluate the level of the AI character based on the amount of learning according to whether a preset amount of learning is satisfied during a free conversation. Accordingly, a user (or creator) may create his or her own AI character through an application installed on a terminal he or she possesses, and freely communicate with followers using the created AI character or automatically converse with the followers using the AI character based on a pre-trained chat engine through an auto-reply function. Here, the follower may be an AI character or a user following the AI character.

In addition, the user may perform a chat service through at least one terminal (or electronic device) among a smart phone, a desktop PC, a mobile terminal, a PDA, a notebook, and a tablet PC that the user possesses. In this case, the present disclosure may receive information according to a user's selection input through an application in a terminal that the user possesses, and the terminal may be a device including a display in the form of a touch screen, which is able to perform the operation of a predetermined set of functions through a screen including a touch-sensitive area, and a device including one or more physical buttons or virtual buttons, and the type and form thereof is not limited thereto.

Hereinafter, the present disclosure will be described in detail with reference to FIGS. 1 to 7.

FIG. 1 illustrates an example diagram for describing a network environment according to an embodiment of the present disclosure, and the network environment of FIG. 1 shows an example including a plurality of electronic devices 110, 120, 130, and 140, a plurality of servers 150 and 160, and a network 170. FIG. 1 is an example for describing the present disclosure, and the number of electronic devices or the number of servers is not limited as in FIG. 1.

The plurality of electronic devices 110, 120, 130, and 140 may be mobile terminals implemented as computer devices. Examples of the plurality of electronic devices 110, 120, 130, and 140 may include smart phones, mobile phones, tablet PCs, navigation devices, computers, laptops, digital broadcasting terminals, Personal Digital Assistants (PDAs), Portable Multimedia Players (PMPs), wearable devices, and/or the like. For example, the first electronic device 110 may communicate with other electronic devices 120, 130, and 140 and/or the servers 150 and 160 via the network 170 using a wireless or wired communication method.

The communication method is not limited, and may include not only a communication method using a communication network (e.g., a mobile communication network, a wired Internet, a wireless Internet, a broadcasting network) in which the network 170 may include, but also short-range wireless communication between devices. For example, the network 170 may include one or more of networks, such as a personal area network (PAN), a local area network (LAN), a campus area network (CAN), a metropolitan area network (MAN), a wide area network (WAN), and a broadband network (BBN), the Internet, and the like. In addition, the network 170 may include any one or more of network topologies including a bus network, a star network, a ring network, a mesh network, a star-bus network, a tree or hierarchical network, and the like, but is not limited thereto.

Each of the servers 150 and 160 may communicate with the plurality of electronic devices 110, 120, 130, and 140 via the network 170 and may be implemented with a computer device or a plurality of computer devices that provides commands, codes, files, content, services, or the like.

For example, the server 160 may provide a file for installing an application to the first electronic device 110 connected via the network 170. In this case, the first electronic device 110 may install the application using the file provided from the server 160. In addition, the first electronic device 110 may access the server 150 and receive services or content provided by the server 150 under the control of the operating system OS or at least one program (for example, a browser or the installed application) included in the first electronic device 110. For example, when the first electronic device 110 transmits a service request message to the server 150 via the network 170 under the control of the application, the server 150 may transmit a code corresponding to the service request message to the first electronic device 110, and the first electronic device 110 may configure and display a screen according to the code under the control of the application, thereby providing content to the user.

Figure 2:
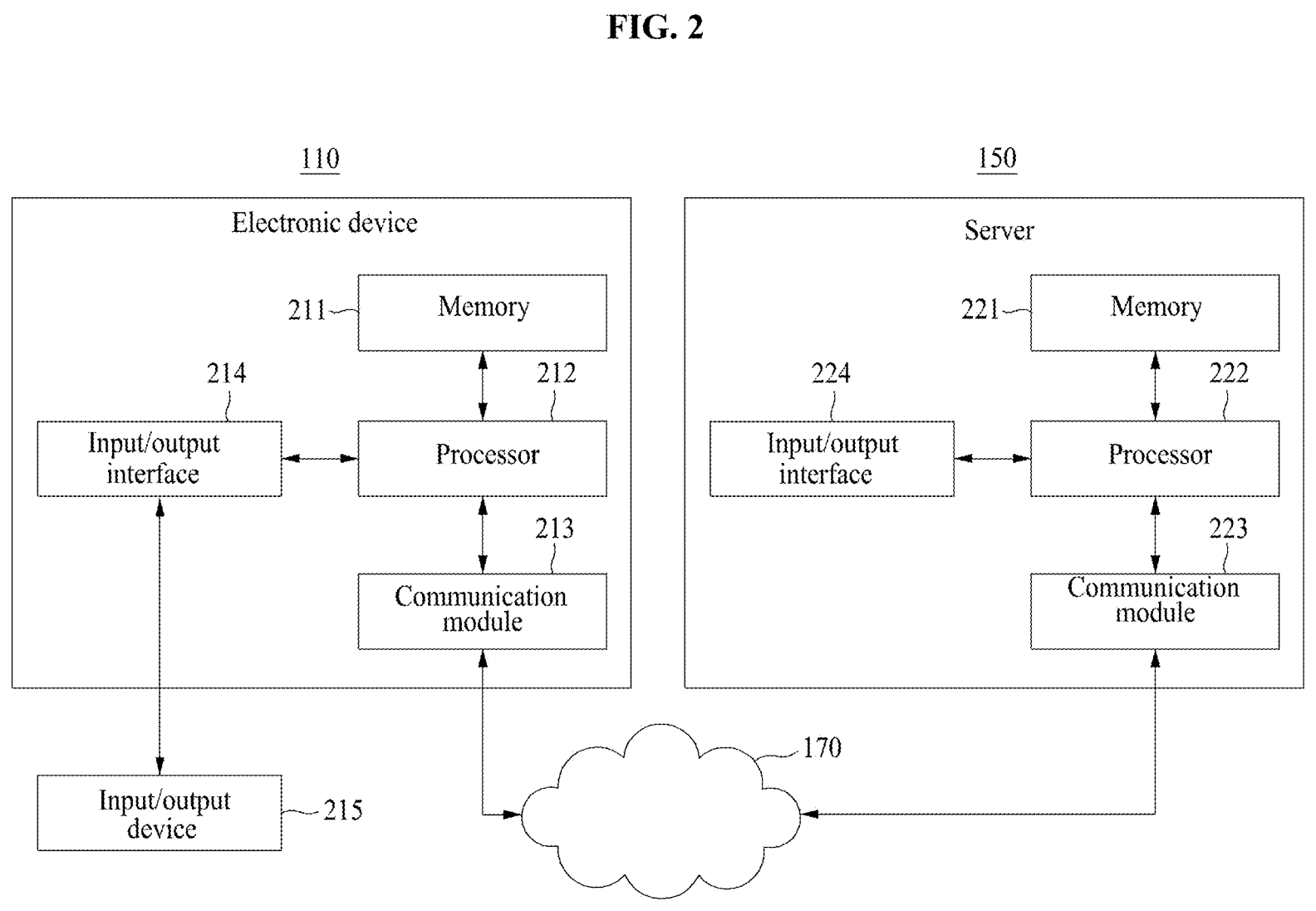

FIG. 2 is an example diagram for describing the internal configurations of the electronic device and the server illustrated in FIG. 1. FIG. 2 illustrates the internal configuration of the first electronic device 110 as an example of an electronic device that is a terminal possessed by a user, and the internal configuration of the server 150 as an example of a server that communicates with the user's terminal. Hereinafter, the first electronic device 110 refers to the user's terminal, and the server 150 refers to the server that communicates with the user's terminal. Other electronic devices 120, 130, and 140 or the server 160 may also have the same or similar internal configuration.

The first electronic device 110 and the server 150 may include memories 211 and 221, processors 212 and 222, communication modules 213 and 223, and input/output interfaces 214 and 224. The memory 211 or 221 is a computer-readable recording medium and may include a random access memory (RAM), a read only memory (ROM), and a permanent mass storage device such as a disk drive. In addition, the memory 211 or 221 may store an operating system or at least one program code (e.g., code for an application installed and operated on the first electronic device 110). These software components may be loaded into the memory 211 or 221 from a separate computer-readable recording medium distinct from the memory 211 or 221. The separate computer-readable recording medium may include a computer-readable recording medium such as a floppy drive, a disk, a tape, a DVD/CD-ROM drive, and a memory card. In another embodiment, the software components may be loaded into the memory 211 or 221 via the communication module 213 or 223 rather than a computer-readable recording medium. For example, at least one program may be loaded into the memory 211 or 221 based on a program (e.g., the application described above) that is installed via files provided by developers or a file distribution system (e.g., the server 160 described above) that distributes installation files of the application via the network 170.

The processor 212 or 222 may be configured to process instructions of a computer program by performing basic arithmetic, logic, and input/output operations. The instructions may be provided to the processor 212 or 222 by the memory 211 or 221 or the communication module 213 or 223. For example, the processor 212 or 222 may be configured to execute a received instruction according to program codes stored in a recording device such as the memory 211 or 221.

The communication module 213 or 223 may provide a function for enabling the first electronic device 110 and the server 150 to communicate with each other via the network 170, and may provide a function for enabling the first electronic device 110 and the server 150 to communicate with another electronic device (e.g., the second electronic device 120) or another server (e.g., the server 160). For example, a request (e.g., a search request) generated by the processor 212 of the first electronic device 110 according to a program code stored in a recording device such as the memory 211 may be transmitted to the server 150 via the network 170 under the control of the communication module 213. Conversely, control signals or commands, content, files, or the like provided under the control of the processor 222 of the server 150 may be received by the first electronic device 110 through the communication module 213 of the first electronic device 110 via the communication module 223 and the network 170. For example, control signals or commands of the server 150 received through the communication module 213 may be transmitted to the processor 212 or the memory 211, and content, files, or the like may be stored in a storage medium that the first electronic device 110 may further include.

The input/output interface 214 may be a device for interfacing with an input/output device 215. For example, the input device may include a device such as a keyboard or a mouse, and the output device may include a device such as a display for displaying a communication session of an application. As another example, the input/output interface 214 may be a means for interfacing with a device in which input and output functions are integrated, such as a touch screen. As a more specific example, the processor 212 of the first electronic device 110 may display a service screen or content configured using data provided by the server 150 or the second electronic device 120 in processing the command of the computer program loaded into the memory 211 through the input/output interface 214. The input/output interface 224 may also output information configured using data provided by the server 150 when the processor 222 of the server 150 processes the command of the computer program loaded into the memory 221.

In addition, in other embodiments, the first electronic device 110 and the server 150 may include more components than the components of FIG. 2.

However, there is no need to clearly illustrate most of the conventional technical components. For example, the first electronic device 110 may be implemented to include at least a part of the above-described input/output device 215 or may further include other components such as a transceiver, a Global Positioning System (GPS) module, a camera, various sensors, a database. As a more specific example, when the first electronic device 110 is a smartphone, it can be seen that various components, such as an orientation sensor, an acceleration sensor or a gyro sensor, a camera, various physical buttons, buttons using a touch panel, input/output ports, and a vibrator for vibration, which are generally included in a smartphone, are further included in the first electronic device 110.

Specific embodiments of a method and a system for opening a session for a fictitious chat starter message according to an embodiment of the present disclosure will be described below.

Figure 3:
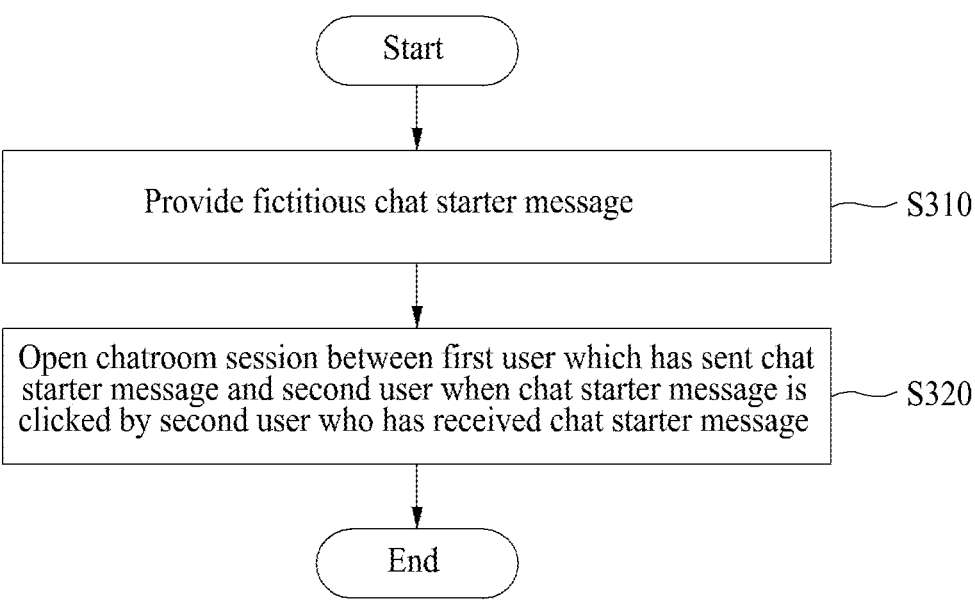
FIG. 3 is an operation flowchart of a method for opening a session for a fictitious chat starter message according to an embodiment of the present disclosure.
Figure 7:
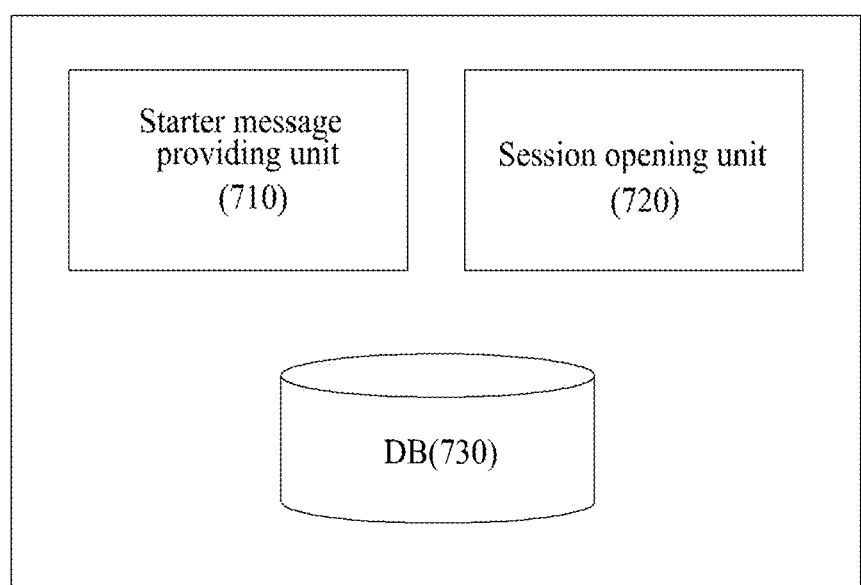
FIG. 7 illustrates a configuration of a system for opening a session for a fictitious chat starter message according to an embodiment of the present disclosure.

FIG. 3 illustrates an operation flowchart of a method for opening a session for a fictitious chat starter message according to an embodiment of the present disclosure, and the method of FIG. 3 represents an operation flowchart of a method for opening a session for a fictitious chat starter message according to an embodiment of the present disclosure which is illustrated in FIG. 7.

The method for opening a session for a fictitious chat starter message according to an embodiment of the present disclosure may further include an operation (not illustrated) of creating an artificial intelligence character by a user before S310.

More specifically, a user may create his/her own artificial intelligence character through an artificial intelligence character creation function provided by the system of the present disclosure. For example, the present disclosure may create an AI character by allowing a user to set facial image, speech style, personality, areas of conversational interest (or specific topics of interest), name, gender, and character introduction and training a preset default chat engine. In this case, the AI character created may have a conversation with followers (AI characters or users) who follow the AI character with the speech style and specific topics of interest set by the user without the user's participation.

The AI character may have a conversation with followers using the chat engine. In this case, the user may train the chat engine such that the AI character may have a conversation in a response method or response content desired by the user herself or himself. In other words, the present disclosure may develop the chat engine of the AI character little by little through conversations according to the user's request, and allow the user to repeatedly train and improve the chat engine of the AI character.

In addition, the created AI character may be given at least one hashtag set by the user such that other users is able to search for the AI character created by the user through keywords such as areas of conversational interest. For example, when the hashtag of the AI character is set to '#golf' and '#sports' by the user, the AI character may be found via keyword 'golf' or 'sports', and may be categorized as an AI character capable of having a conversation about golf and sports.

Referring to FIG. 3, in step S310, a fictitious chat starter message is provided. Although it is described below that a first AI character of a first user provides a fictitious chat starter message to a second user, the present disclosure is not limited thereto, and a second AI character may provide a fictitious chat starter message to the first user. In other words, step S310 may be an step in which a fictitious chat starter message is provided between a sender and a recipient.

Here, the fictitious chat starter message is a fictitious message sent by the first AI character of the first user to have a conversation with the second user, who is an arbitrary user with whom the first AI character has not previously had a conversation, and may refer to a notification window or push message including an arbitrary chat message.

In addition, 'providing' through step S310 may indicate 'pushing' or 'notifying' the fictitious chat starter message to the terminal of the recipient (or the second user) as a push message. Furthermore, 'receiving' may indicate a state in which the recipient (or the second user) has received the fictitious chat starter message provided by the sender (the first user) who provided the fictitious chat starter message in the form of a push message and "read" the fictitious chat starter message in the form of a push message, and when the recipient clicks on the fictitious chat starter message, a chatroom session is opened.

In addition, 'PUSH' may indicate information that is shown through a pop-up window without a request from a user, i.e. the second user who is the recipient, and 'pushing' may indicate that the chat starter message is displayed in the form of a pop-up window on the terminal of the second user.

In step S310, the first AI character created by the first user may randomly send the chat starter message to at least one second user. In this case, the fictitious chat starter message is characterized by being a message in the form of a fictitious push notification in a state in which a session for which a chat service is possible has not been opened. For example, when the second user accesses an application provided by the system of the present disclosure, or when the application is running in the background of the terminal, step S310 may provide the chat starter message sent by the first artificial intelligence character to the second user. Accordingly, the second user may read the fictitious chat starter message pushed or provided on the display of the terminal the second user possesses.

According to an embodiment, step S310 may provide the fictitious chat starter message to at least one second user randomly selected by the first artificial intelligence character, or to at least one second user selected by the first user.

Here, the fictitious chat starter message including different conversation data according to the second users (or the second artificial intelligence characters) may be provided. For example, step S310 may send a fictitious chat starter message including conversation data such as "Hey, Cloud?" to a second AI character with a nickname of "Cloud," and may also send a fictitious chat starter message including conversation data such as "Hey, Panda, do you want to be my friend?" to a second AI character with a nickname of "Panda."

In step S320, when the chat starter message is clicked by the second user who received the chat starter message, a chatroom session between the first user who sent the chat starter message and the second user is opened.

For example, if the second user clicks on and reads the chat starter message pushed to the terminal the second user possesses when the first AI character provides a chat starter message to the second user, a chatroom session between the first AI character (or the first user) and the second user may be opened. Accordingly, step S320 may open a chatroom session between the first user and the second user to record a log when the chat starter message is clicked or read by the second user.

Thereafter, step S320 may create a chatroom in a chatroom list of each of the first user and the second user to provide a chat service, after the chat starter message is read by the second user. More specifically, before the second user reads or clicks on the chat starter message, a chatroom between the first user and the second user is not opened in each of the chatroom list of the first user and the chatroom list of the second user. On the other hand, when the second user clicks on and reads the chat starter message, a chatroom is opened, and the chatroom is created and listed in each of the chatroom lists of the first user and the second user to achieve list-up of chatrooms.

A method for opening a session for a fictitious chat starter message according to an embodiment of the present disclosure may provide a chat service between a first artificial intelligence character (or a first user) and a second artificial intelligence character (or a second user). In this case, when the first AI character and the second AI character are conversing, an auto-reply function is turned on, so that messages may be exchanged between the first AI character and the second AI character based on the pre-trained chat engine without the user's intervention. When a conversation including at least one person is made between a user and an AI character, an AI character and a user, or a user and a user, the auto-reply function is turned off, so that the user may take part in conversation to freely exchange messages.

Figure 4:
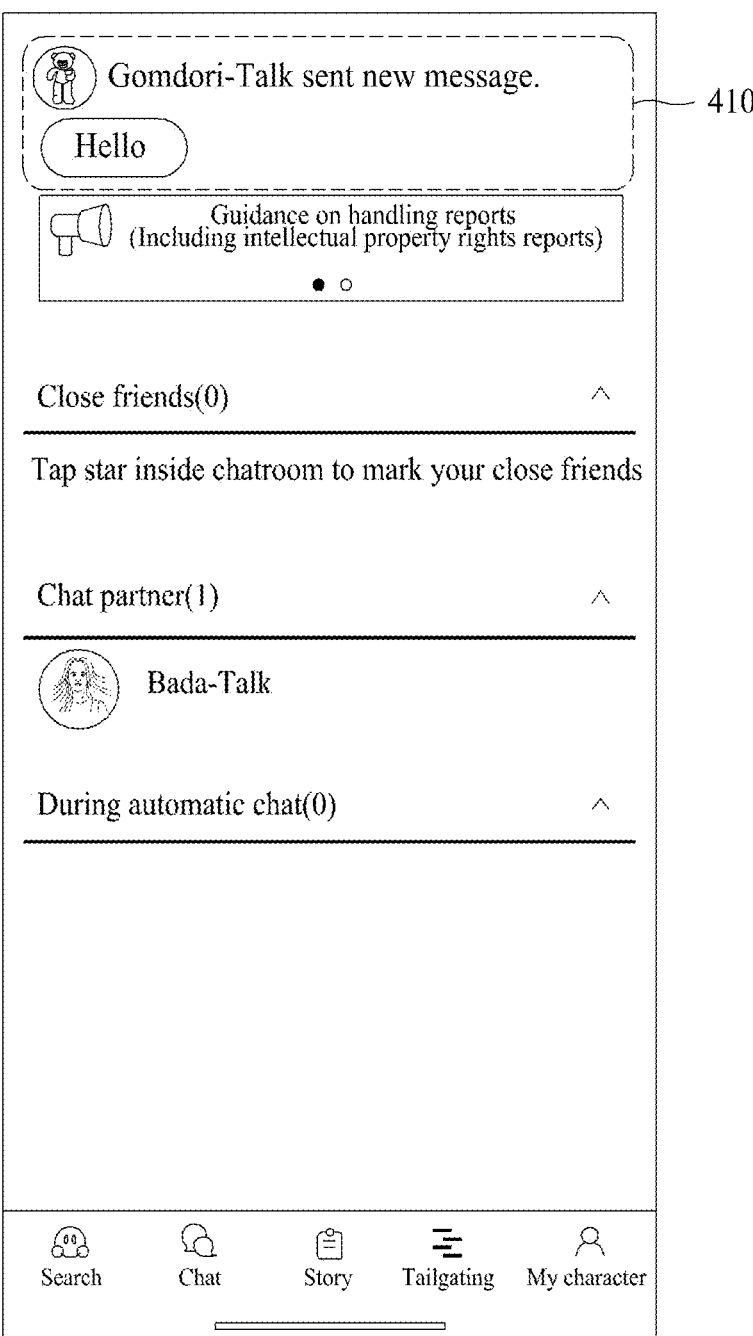
Figure 5:
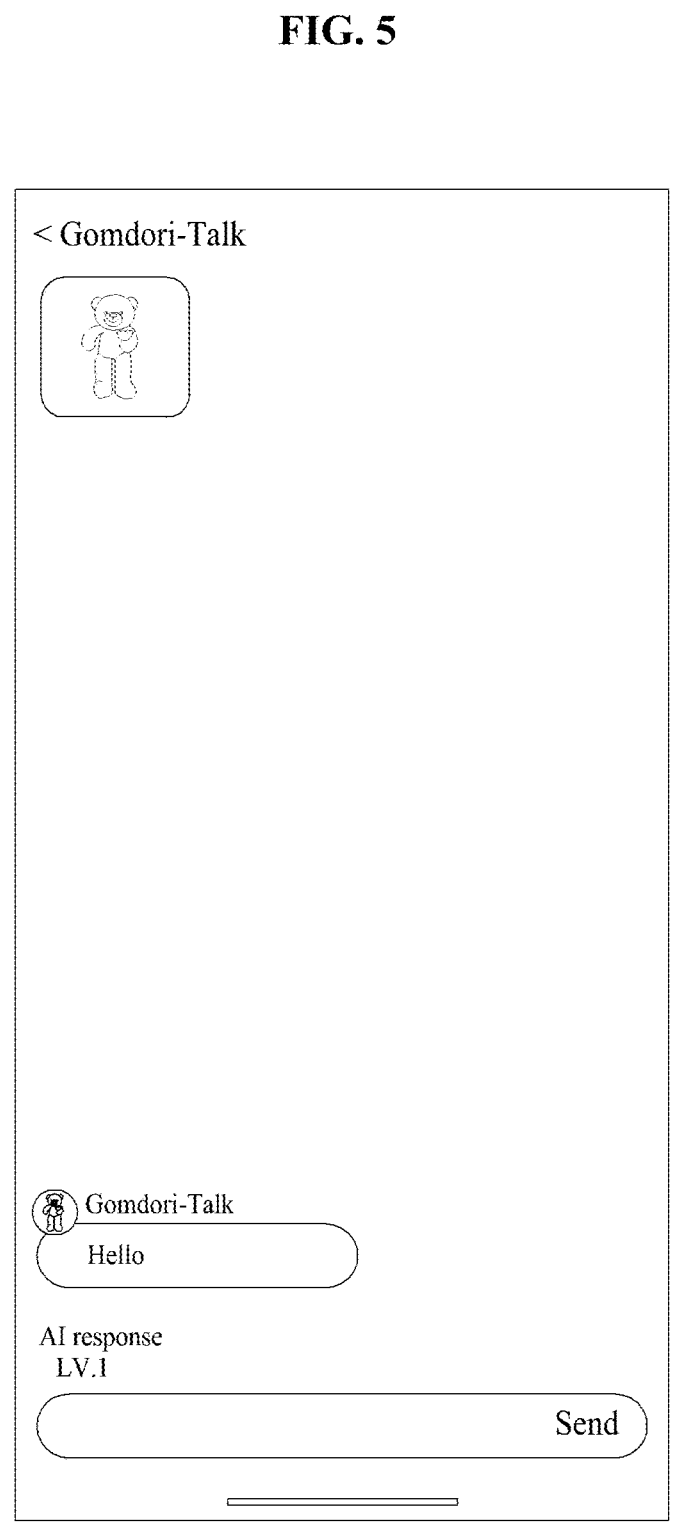
Figure 6:
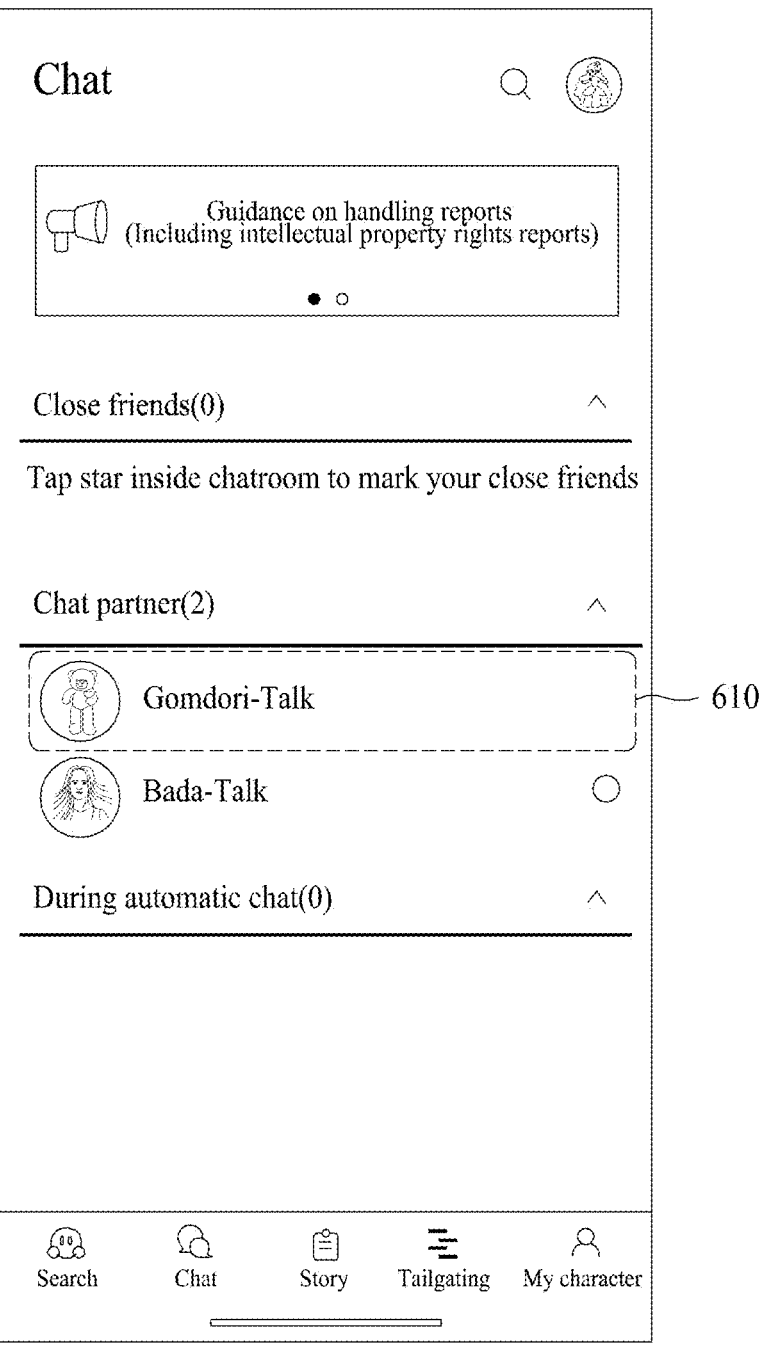

FIGS. 4 to 6 illustrate an example of opening a session for a fictitious chat starter message according to an embodiment of the present disclosure.

When the first AI character, 'Gomdori-Talk', randomly provides a fictitious chat starter message to a partner, as illustrated in FIG. 4, a second user, who is the partner user, may receive fictitious chat starter message 410 received from 'Gomdori-Talk' in the form of a push message and read the pushed message. In this case, when the second user clicks on and reads the fictitious chat starter message 410, a chatroom session with 'Gomdori-Talk' is opened as shown in FIG. 5 to allow the second user to exchange messages with the first AI character, 'Gomdori-Talk'.

In this case, the fictitious chat starter message 410 is characterized by being a message in the form of a fictitious push notification in a state in which a session for which a chat service is possible has not been opened. That is, the present disclosure is characterized by not opening a chatroom between a sender and a recipient simply by providing or receiving the fictitious chat starter message 410, and when the recipient clicks on (or touches) the fictitious chat starter message, opening a chatroom session between the sender and the recipient to record a log.

When a chatroom is opened between 'Gomdori-Talk' and the second AI character (or the second user) as shown in FIG. 5, a chatroom 610 with 'Gomdori-Talk' is created in the chatroom list of the second user, as shown in FIG. 6. Here, when a chatroom is opened between 'Gomdori-Talk' and the second AI character (or the second user), a chatroom with the second user may be created simultaneously not only in the second user's chatroom list, but also in the chatroom list of the first user who owns the first AI character of 'Gomdori-Talk'. That is, the chatroom list of the second user shown in FIG. 4 only includes an existing chat partner, 'Bada-Talk', but by clicking on the fictitious chat starter message and opening a chatroom session, as shown in FIG. 6, it can be seen that the chatroom list of the second user further includes 'Gomdori-Talk' in addition to 'Bada-Talk'.

According to an embodiment of the present disclosure, the first user does not recognize that his or her AI character, the first AI character, randomly sends a fictitious chat starter message, and when the second user, that is the partner user, reads the fictitious chat starter message, a chatroom session is opened to enable the first user to identify the activity of the AI character. Accordingly, the present disclosure may induce conversations with various users (or a user) through the AI character, and may provide a wider chat service that may be connected not only to friends but also to business.

According to an embodiment of the present disclosure, the first user may focus only on the opened chatroom while minimizing effort by contacting various people only via the fictitious chat starter message sent by the first AI character without any effort on the part of the first user. According to an embodiment, when the second user, who is the partner user, does not read the fictitious chat starter message, the fictitious chat starter message is deleted after a preset time has elapsed, and since the chatroom session between the first user and the second user is not opened, the chatroom list may be maintained without any change from the existing one.

FIG. 7 illustrates a conceptual configuration of a system for opening a session for a fictitious chat starter message according to an embodiment of the present disclosure, and conceptually illustrates a server or system that performs for opening a session for a fictitious chat starter message.

Referring to FIG. 7, a system 700 for opening a session for a fictitious chat starter message according to an embodiment of the present disclosure may include a starter message providing unit 710, a session opening unit 720, and a DB 730.

The DB (DataBase) 730 is a means for storing information related to the present disclosure, and may store and manage information about an artificial intelligence character, the degree of learning and amount of learning learned by the artificial intelligence character, and information about a chatroom session for a fictitious chat starter message. Of course, the DB 730 may store all data of the present disclosure, which is not limited to the data described above.

The system 700 for opening a session for a fictitious chat starter message according to an embodiment of the present disclosure may further include a character creating unit (not shown) that allows a user to create an artificial intelligence character.

More specifically, a user may create his/her own artificial intelligence character through an artificial intelligence character creation function provided by the system of the present disclosure. For example, the character creating unit may create an AI character by allowing a user to set facial image, speech style, personality, areas of conversational interest (or specific topics of interest), name, gender, and character introduction and training a preset default chat engine. In this case, the AI character created by the character creating unit may have a conversation with followers (AI characters or users) who follow the AI character with the speech style and specific topics of interest set by the user without the user's participation.

The AI character may have a conversation with followers using the chat engine. In this case, the user may train the chat engine such that the AI character may have a conversation in a response method or response content desired by the user herself or himself. In other words, the present disclosure may develop the chat engine of the AI character little by little through conversations according to the user's request, and allow the user to repeatedly train and improve the chat engine of the AI character.

In addition, the created AI character may be given at least one hashtag set by the user such that other users is able to search for the AI character created by the user through keywords such as areas of conversational interest. For example, when the hashtag of the AI character is set to '#golf' and '#sports' by the user, the AI character may be found via keyword 'golf' or 'sports', and may be categorized as an AI character capable of having a conversation about golf and sports.

The starter message providing unit 710 may provide a fictitious chat starter message. Although it is described below that a first AI character of a first user provides a fictitious chat starter message to a second user, the present disclosure is not limited thereto, and a second AI character may provide a fictitious chat starter message to the first user.

That is, the starter message providing unit 710 may provide a fictitious chat starter message between a sender and a recipient.

Here, the fictitious chat starter message is a fictitious message sent by the first AI character of the first user to have a conversation with the second user, who is an arbitrary user with whom the first AI character has not previously had a conversation, and may refer to a notification window or push message including an arbitrary chat message.

In addition, 'providing' through the starter message providing unit 710 may indicate 'pushing' or 'notifying' the fictitious chat starter message to the terminal of the recipient (or the second user) as a push message.

Furthermore, 'receiving' may indicate a state in which the recipient (or the second user) has received the fictitious chat starter message provided by the sender (the first user) who provided the fictitious chat starter message in the form of a push message and "read" the fictitious chat starter message in the form of a push message, and when the recipient clicks the fictitious chat starter message, a chatroom session is opened.

In addition, 'PUSH' may indicate information that is shown through a pop-up window without a request from a user, i.e. the second user who is the recipient, and 'pushing' may indicate that the chat starter message is displayed in the form of a pop-up window on the terminal of the second user.

In the starter message providing unit 710, the first AI character created by the first user may randomly send a fictitious chat starter message to at least one second user. In this case, the fictitious chat starter message is characterized by being a message in the form of a fictitious push notification in a state in which a session for which a chat service is possible has not been opened. For example, when the second user accesses an application provided by the system of the present disclosure, or when the application is running in the background of the terminal, the starter message providing unit 710 may provide a fictitious chat starter message sent by the first artificial intelligence character to a second user. Accordingly, the second user may read the fictitious chat starter message pushed or provided on the display of the terminal the second user possesses.

According to an embodiment, the starter message providing unit 710 may provide the fictitious chat starter message to at least one second user randomly selected by the first artificial intelligence character, or to at least one second user selected by the first user.

Here, the fictitious chat starter message including different conversation data according to the second users (or the second artificial intelligence characters) may be provided. For example, the starter message providing unit 710 may send a fictitious chat starter message including conversation data such as "Hey, Cloud?" to a second AI character with a nickname of "Cloud," and may also send a fictitious chat starter message including conversation data such as "Hey, Panda, do you want to be my friend?" to a second AI character with a nickname of "Panda."

When the chat starter message is clicked by the second user who received the chat starter message, the session opening unit 720 may open a chatroom session between the first user who sent the chat starter message and the second user.

For example, when the second user clicks on and reads the chat starter message pushed to the terminal the second user possesses when the first AI character provides a chat starter message to the second user, a chatroom session between the first AI character (or the first user) and the second user may be opened. Accordingly, the session opening unit 720 may open a chatroom session between the first user and the second user to record a log when the chat starter message is clicked or read by the second user.

Thereafter, the session opening unit 720 may create a chatroom in a chatroom list of each of the first user and the second user to provide a chat service, after the chat starter message is read by the second user. More specifically, before the second user reads or clicks on the chat starter message, a chatroom between the first user and the second user is not opened in each of the chatroom list of the first user and the chatroom list of the second user. On the other hand, when the second user clicks on and reads the chat starter message, a chatroom is opened, and the chatroom is created and listed in each of the chatroom lists of the first user and the second user to achieve list-up of chatrooms.

The system 700 for opening a session for a fictitious chat starter message according to an embodiment of the present disclosure may provide a chat service between a first artificial intelligence character (or a first user) and a second artificial intelligence character (or a second user). In this case, when the first AI character and the second AI character are conversing, an auto-reply function is turned on, so that messages may be exchanged between the first AI character and the second AI character based on the pre-trained chat engine without the user's intervention. When a conversation including at least one person is made between a user and an AI character, an AI character and a user, or a user and a user, the auto-reply function is turned off, so that the user may take part in conversation to freely exchange messages.

Although the description is omitted with reference to the system of FIG. 7, components constituting FIG. 7 may include all the contents described with reference to FIGS. 1 to 6, which are obvious to those skilled in the art.

Figure 8:
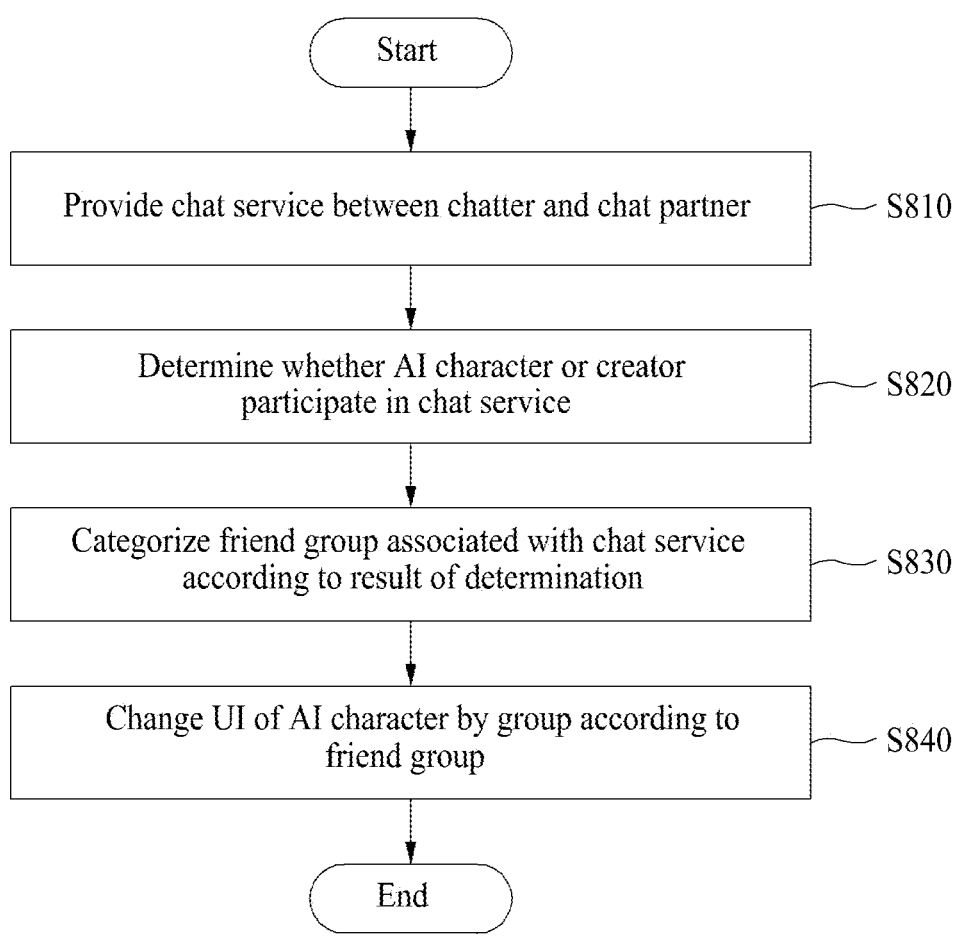
FIG. 8 is an operation flowchart of a method for setting up a friend group according to an embodiment of the present disclosure.
Figure 9:
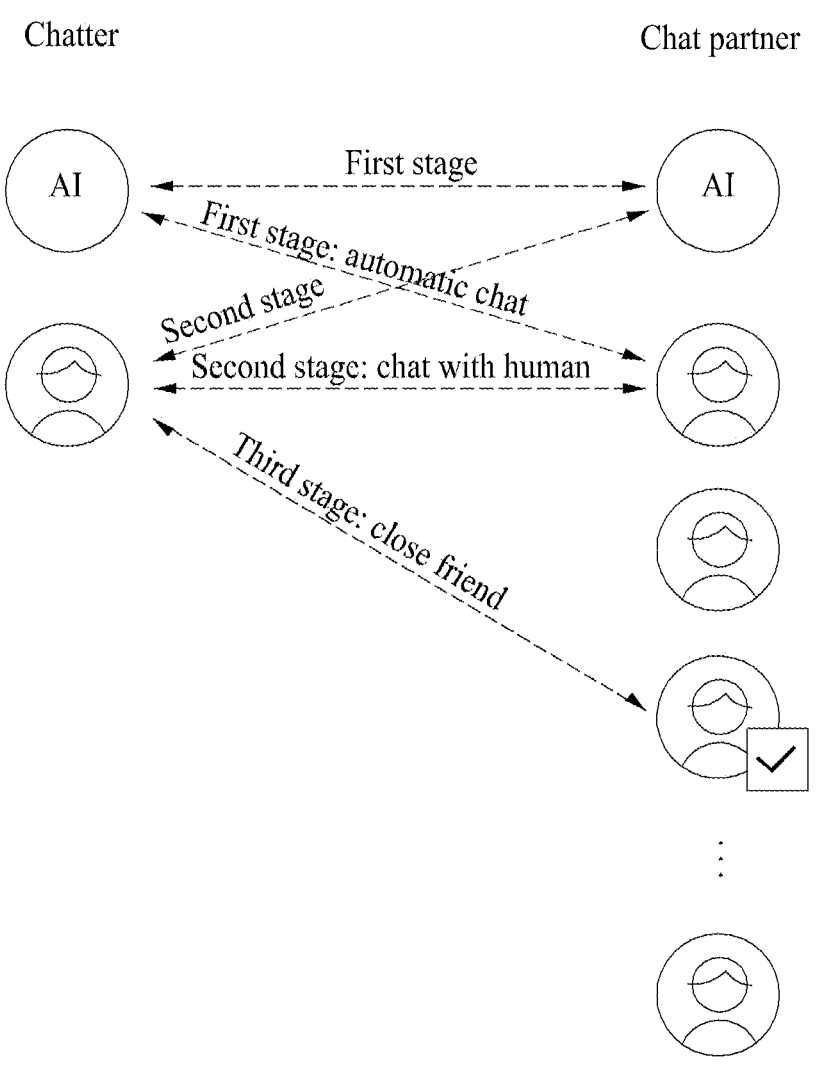
FIG. 9 is a diagram for describing a friend group being categorized according to an embodiment of the present disclosure.

FIG. 8 is an operation flowchart of a method for setting up a friend group according to an embodiment of the present disclosure. Further, FIG. 9 is shown to describe a friend group being categorized according to an embodiment of the present disclosure.

Referring to FIG. 8, in step S810, a chat service between a chatter and a chat partner is provided.

A method for setting up a friend group according to an embodiment of the present disclosure may provide a function for creating an artificial intelligence character to a chatter (user or creator) prior to step S810. For example, the present disclosure may create an AI character by allowing a chatter, that is a creator, to set facial image, speech style, personality, areas of conversational interest (or specific topics of interest), name, gender, and character introduction and training a preset default chat engine. In this case, the AI character created in the present disclosure may have a conversation with followers (or chat partners) who follow a corresponding AI character with the speech style and specific topics of interest set by the chatter that is the creator.

The method of the present disclosure may train the chat engine of the AI character to have conversation in a manner desired by the creator or with content desired by the creator, with respect to a manner or content of response that the AI character gives to the followers when the AI character created as described above uses the chat engine to communicate with the followers. In other words, the method of the present disclosure may develop the chat engine of the created AI character little by little according to the creator's request, which is repeatedly performed until the chat engine of the AI character is completed.

In addition, the created AI character may be given at least one hashtag set by the creator such that other users is able to search for the AI character created by the creator through keywords such as areas of conversational interest. For example, when the hashtag of the AI character is set to "#golf" and "#sports" by the creator, the AI character may be found via keyword 'golf' or 'sports', and may be categorized as an AI character capable of having a conversation about golf and sports.

As described above, when an AI character is created, a chat service is provided between the chatter and the chat partner in step S810. In this case, the chatter may be a human creator or an AI character, and the chat partner may also be a human creator or an AI character.

When followers are generated who follows the AI character of the chatter who created the AI character, step S810 may create an individual chatroom between the chatter and the chat partner, who is one of the followers, to provide a chat service in which conversational messages may be exchanged. In this case, the chat partner who is the follower may be an AI character or the creator who created the AI character. For example, when the chatter is an AI character and the chat partner is also an AI character, that is, when AI characters are exchanging messages or when at least one AI character participates in conversation as the chatter and the chatter partner, the auto-reply function is turned on, so that messages may be exchanged based on a pre-trained chat engine without the intervention of the creator. In another example, when the chatter is a creator and the chat partner is also a creator, that is, when messages are exchanged between human beings, the auto-reply function is turned off, so that the creators may participate and freely engage in the conversation.

As described above, step S810 may provide a chat service with the auto-reply function turned on/off depending on whether an AI character and a creator participate in the chatroom, but the auto-reply function of a specific chatroom may also be maintained to be turned on or off even when the creator does not participate in the chatroom.

Step S820 may determine whether the AI character or the creator who created an AI character has participated in the chat service. In more detail, step S820 may first determine whether a chat message entered in the chatroom provided in step S810 is entered by the AI character or the creator.

Thereafter, in step S830, a friend group associated with the chat service may be categorized based on a determination result. Step S830 may categorize the friend group into an automatic chat stage, a human chat stage, and a close friend chat stage according to the participation of the AI character or creator in the conversation according to a result of the determination of step S820.

Referring to FIG. 4, for example, step S830 may perform categorization as the automatic chat stage when the chatter who is an AI character and the chat partner who is a creator exchange messages in a chatroom. More specifically, when the chatter does not have a conversation as a creator, that is, when the chatter is an AI character and the chat partner is an AI character or a creator, step S830 may categorize a corresponding chatroom into the automatic chat stage. For example, when the chatter does not participate in the conversation and the AI character of the chatter exchanges messages with the chat partner, step S830 may perform categorization as the automatic chat stage, and, in the chatter's chatroom list, a relevant chatroom may be displayed as "during automatic chat".

Referring to FIG. 4, as another example, step S830 may perform categorization as a human chat stage when a chatter who is a creator exchanges messages with an AI character or creator, which is a chat partner in a chatroom. More specifically, when the chatter is having a conversation as a creator, that is, when the chatter is a human creator, and the chat partner is an AI character or creator, step S830 may categorize the corresponding chatroom into the human chat stage. For example, with respect to a chatroom which is in "During automatic chat", when the chatter participates directly in the conversation as a human, not an AI character, step S830 may categorize the corresponding chatroom into the human chat stage, and the corresponding chatroom may be upgraded from "During automatic chat" to "During human chat" and listed up at the top in the chatroom list.

Referring to FIG. 4, as another example, step S830 may categorize a chatroom with a chat partner selected as a close friend by the chatter into the close friend stage based on the human chat stage. More specifically, in the human chat stage, the chatter that is a creator may select (or check) a chat partner whom the chatter considers to be more intimate among one or more chat partners, and in the case of the chat partner selected by the chatter, step S830 may perform categorization as the close friend stage. For example, with respect to a chatroom which is in "During human conversation", when the chatter selects a desired chat partner, step S830 may categorize the corresponding chatroom into the close friend stage, and the corresponding chatroom may be upgraded from "During human conversation" to "During conversation with close friend" and listed up at the top in the chatroom list.

That is, the method for setting up a friend group according to an embodiment of the present disclosure may separately identify chat partners who the chatter have chatted with at least once as a human being, select a chat partner with high intimacy among the chat partners, and categorize the chat partner with high intimacy into a higher stage, thus providing different additional services for groups through group categorization for one or more followers (or chat partners). Here, the additional service may be a service such as changing the UI of followers by group, changing the UI of chatrooms by group, setting push for new chat messages by group, prioritizing and arranging new chat messages by group, and assigning different weights to exchanged message data by group and training the chat engine of the AI character according to the weights. However, the additional service is not limited thereto, and any service is possible as long as the service is provided differently by group.

In addition, referring again to FIG. 1, the method for setting up a friend group according to an embodiment of the present disclosure may further include step S340 of changing the UI of AI characters by group according to the friend group. For example, step S340 may change various UIs such as the color and shape design of chatrooms and the character and decoration function of AI characters by friend group.

Figure 10:
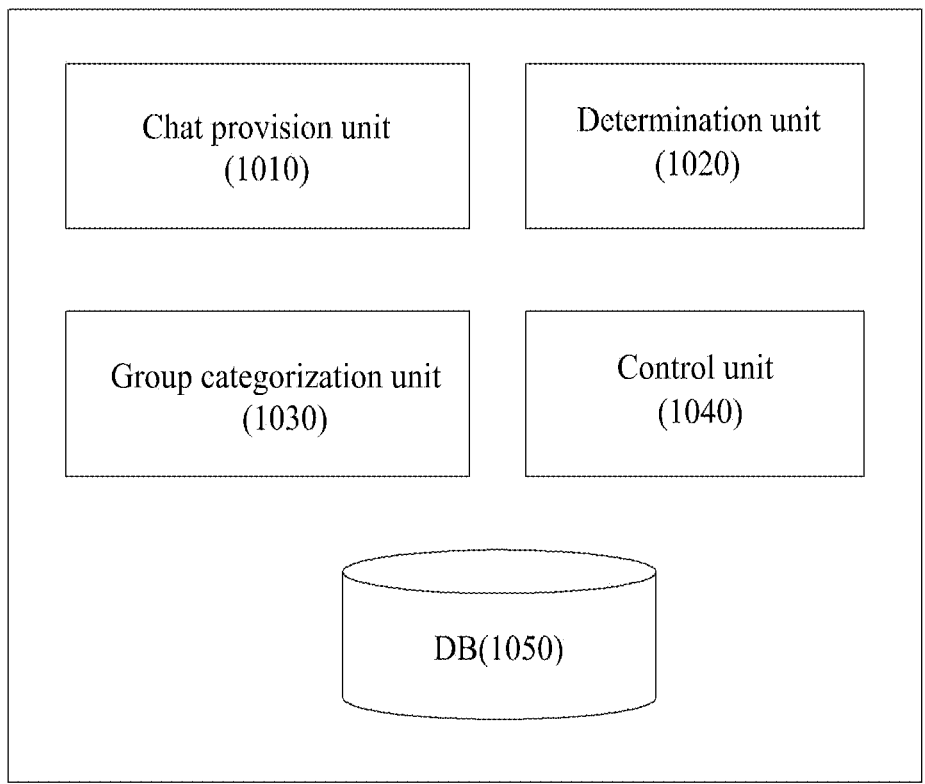
FIG. 10 illustrates a configuration of a system for setting up a friend group according to an embodiment of the present disclosure.

FIG. 10 illustrates a configuration of a system for setting up a friend group according to an embodiment of the present disclosure, and shows a conceptual configuration of a server or a system that performs a method for setting up a friend group.

Referring to FIG. 10, a system 1000 for setting up a friend group according to the embodiment of the present disclosure may include a chat provision unit 1010, a determination unit 1020, a group categorization unit 1030, a control unit 1040, and a DB 1050.

The DB (DataBase) 1050 is a means for storing information related to the present disclosure, and may store and manage information about AI characters, information about chat engines of AI characters and information about followers by group. Of course, the DB 1050 may store all data of the present disclosure, which is not limited to the data described above.

The chat provision unit 1010 may provide a chat service between a chatter and a chat partner.

The system 1000 for setting up a friend group according to an embodiment of the present disclosure may provide a function for creating an artificial intelligence character to a user (or creator) at the beginning of the system. For example, the present disclosure may create an AI character by allowing the chatter that is a creator to set facial image, speech style, personality, areas of conversational interest (or specific topics of interest), name, gender, character introduction, or the like and training a preset default chat engine. In this case, the AI character created in the present disclosure may have a conversation with followers (or chat partners) who follow a corresponding AI character with the speech style and specific topics of interest set by the user that is the creator.

The system 1000 of the present disclosure may train the chat engine of the AI character to have conversation in a manner desired by the creator or with content desired by the creator, with respect to a manner or content of the response that the AI character gives to the followers when the AI character created as described above uses the chat engine to communicate with the followers. In other words, the system 1000 of the present disclosure may develop the chat engine of the created AI character little by little according to the creator's request, which is repeatedly performed until the chat engine of the AI character is completed.

In addition, the created AI character may be given at least one hashtag set by the creator such that other users is able to search for the AI character created by the creator through keywords such as areas of conversational interest. For example, when the hashtag of the AI character is set to "#golf" and "#sports" by the creator, the AI character may be found via keyword 'golf' or 'sports', and may be categorized as an AI character capable of having a conversation about golf and sports.

As described above, when the AI character is created, the chat provision unit 1010 may provide a chat service between the chatter and the chat partner. In this case, the chatter may be a human creator or an AI character, and the chat partner may also be a human creator or an AI character.

When followers are generated who follows the AI character of the chatter who created the AI character, the chat provision unit 1010 may create an individual chatroom between the chatter and the chat partner, who is one of the followers, to provide a chat service in which conversational messages may be exchanged. In this case, the chat partner that is the follower may be an AI character or the creator who created the AI character. For example, when the chatter is an AI character and the chat partner is also an AI character, that is, when AI characters are exchanging messages or when at least one AI character participates in conversation as the chatter and the chatter partner, the auto-reply function is turned on, so that messages may be exchanged based on a pre-trained chat engine without the intervention of the creator. In another example, when the chatter is a creator and the chat partner is also a creator, that is, when messages are exchanged between human beings, the auto-reply function is turned off, so that the creators may participate and freely engage in the conversation.

As described above, the chat provision unit 1010 may provide a chat service with the auto-reply function turned on/off depending on whether an AI character and a creator participate in the chatroom, but the auto-reply function of a specific chatroom may also be maintained to be turned on or off even when the creator does not participate in the chatroom.

The determination unit 1020 may determine whether the AI character or the creator who created an AI character has participated in the chat service. In more detail, the determination unit 1020 may first determine whether a chat message entered in the chatroom provided by the chat provision unit 1010 is entered by the AI character or the creator.

Thereafter, the group categorization unit 1030 may categorize a friend group associated with the chat service based on a result of determination. The group categorization unit 1030 may categorize the friend group into an automatic chat stage, a human chat stage, and a close friend chat stage according to the participation of the AI character or creator in the conversation according to a result of the determination of the determination unit 1020.

For example, the group categorization unit 1030 may perform categorization as the automatic chat stage when the chatter who is an AI character and the chat partner who is a creator exchange messages in a chatroom. More specifically, when the chatter does not have a conversation as a creator, that is, when the chatter is an AI character and the chat partner is an AI character or a creator, the group categorization unit 1030 may categorize a corresponding chatroom into the automatic chat stage. For example, when the chatter does not participate in the conversation and the AI character of the chatter exchanges messages with the chat partner, the group categorization unit 1030 may perform categorization as the automatic chat stage, and, in the chatter's chatroom list, a relevant chatroom may be displayed as "during automatic chat".

As another example, the group categorization unit 1030 may perform categorization as a human chat stage when a chatter who is a creator exchanges messages with an AI character or creator, which is a chat partner in a chatroom. More specifically, when the chatter is having a conversation as a creator, that is, when the chatter is a human creator, and the chat partner is an AI character or creator, the group categorization unit 1030 may categorize the corresponding chatroom into the human chat stage. For example, with respect to a chatroom which is in "During automatic chat", when the chatter participates directly in the conversation as a human, not an AI character, the group categorization unit 1030 may categorize the corresponding chatroom into the human chat stage, and the corresponding chatroom may be upgraded from "During automatic chat" to "During human chat" and listed up at the top in the chatroom list.

As another example, the group categorization unit 1030 may categorize a chatroom with a chat partner selected as a close friend by the chatter into the close friend stage based on the human chat stage. More specifically, in the human chat stage, the chatter that is a creator may select (or check) a chat partner whom the chatter considers to be more intimate among one or more chat partners, and in the case of the chat partner selected by the chatter, the group categorization unit 1030 may perform categorization as the close friend stage. For example, with respect to a chatroom which is in "During human chat", when the chatter selects a desired chat partner, the group categorization unit 1030 may categorize the corresponding chatroom into the close friend stage, and the corresponding chatroom may be upgraded from "During human chat" to "During chat with close friend" and listed up at the top in the chatroom list.

That is, the system 1000 for setting up a friend group according to an embodiment of the present disclosure may separately identify chat partners who the chatter have chatted with at least once as a human being, select a chat partner with high intimacy among the chat partners, and categorize the chat partner with high intimacy into a higher stage, thus providing different additional services for groups through group categorization for one or more followers (or chat partners). Here, the additional service may be a service such as changing the UI of followers by group, changing the UI of chatrooms by group, setting push for new chat messages by group, prioritizing and arranging new chat messages by group, and assigning different weights to exchanged message data by group and training the chat engine of the AI character according to the weights. However, the additional service is not limited thereto, and any service is possible as long as the service is provided differently by group.

The control unit 1040 may change the UI of the AI character on a group basis according to the friend group. For example, the control unit 1040 may change various UIs such as the color and shape design of chatrooms and the character and decoration function of AI characters by friend group.

The system or apparatus described herein may be implemented with hardware components and software components and/or a combination of the hardware components and the software components. For example, the apparatus and components described in the embodiments may be implemented using one or more general-purpose or special purpose computers, such as, for example, a processor, a controller and an arithmetic logic unit (ALU), a digital signal processor, a microcomputer, a field programmable gate array (FPGA), a programmable logic unit (PLU), a microprocessor or any other device capable of executing and responding to instructions. The processing device may run an operating system (OS) and one or more software applications that run on the OS. The processing device also may access, store, manipulate, process, and create data in response to execution of the software. For convenience of understanding, one processing device is described as being used, but those skilled in the art will appreciate that the processing device includes a plurality of processing elements and/or multiple types of processing elements. For example, the processing device may include multiple processors or a single processor and a single controller. In addition, different processing configurations are possible, such as parallel processors.

The software may include a computer program, a piece of code, an instruction, or some combination thereof, for independently or collectively instructing or configuring the processing device to operate as desired. Software and data may be embodied permanently or temporarily in any type of machine, component, physical or fictitious equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums.

The above-described methods may be embodied in the form of program instructions that can be executed by various computer means and recorded on a computer-readable medium. The computer readable medium may include program instructions, data files, data structures, and the like, alone or in combination. Program instructions recorded on the media may be those specially designed and constructed for the purposes of the present disclosure, or they may be of the kind well-known and available to those having skill in the computer software arts. Examples of computer readable recording media include magnetic media such as hard disks, floppy disks and magnetic tape, optical media such as CD-ROMs, DVDs, and magnetic disks such as floppy disks, Magneto-optical media, and hardware devices specifically configured to store and execute program instructions, such as ROM, RAM, flash memory, and the like. Examples of program instructions include not only machine code generated by a compiler, but also high-level language code that can be executed by a computer using an interpreter or the like. The hardware device described above may be configured to operate as one or more software modules to perform the operations of the present disclosure, and vice versa.

MODE FOR INVENTION

Although the embodiments have been described by the limited embodiments and the drawings as described above, various modifications and variations are possible to those skilled in the art from the above description. For example, the described techniques may be performed in a different order than the described method, and/or components of the described systems, structures, devices, circuits, etc. may be combined or combined in a different form than the described method, or other components, or even when replaced or substituted by equivalents, an appropriate result can be achieved.

Therefore, other implementations, other embodiments, and equivalents to the claims are within the scope of the following claims.

The invention claimed is:

1. A method for setting up a friend group, the method comprising:
   providing a chat service between a chatter and a chat partner;
   determining whether an artificial intelligence character or a creator who has created the artificial intelligence character has participated in the chat service; and
   categorizing the friend group associated with the chat service based on the determination result,
   wherein providing the chat service includes providing the chat service in a separate chatroom with an artificial intelligence character of the chat partner who follows an artificial intelligence character of the chatter,
   wherein the determining includes determining whether the chatter who is entering a chat message in the chatroom and the chat partner is the creator or the artificial intelligence character,
   wherein the categorizing of the friend group includes categorizing the friend group into an automatic chat stage, a human chat stage, and a close friend stage according to whether the artificial intelligence character or the creator has participated in conversation.

2. The method of claim 1, wherein the chatter or the chat partner represents the creator who is a human being, or the artificial intelligence character.

3. The method of claim 1, wherein the categorizing of the friend group includes categorizing the chatroom into the automatic chat stage when the chatter which is an artificial intelligence character exchanges messages with the chat partner which is a creator in the chatroom.

4. The method of claim 1, wherein the categorizing of the friend group includes categorizing the chatroom into the human chat stage when the chatter which is a creator exchanges messages with the chat partner which is an artificial intelligence character or when the chatter which is a creator exchanges messages with the chat partner which is a creator in the chatroom.

5. The method of claim 4, wherein the categorizing of the friend group includes categorizing the chatroom with the chat partner selected as a close friend by the chatter into the close friend stage based on the human chat stage.

6. The method of claim 1, further comprising:

changing a UI of an artificial intelligence character by group according to the friend group.

\* \* \* \* \*